Patented Apr. 13, 1943

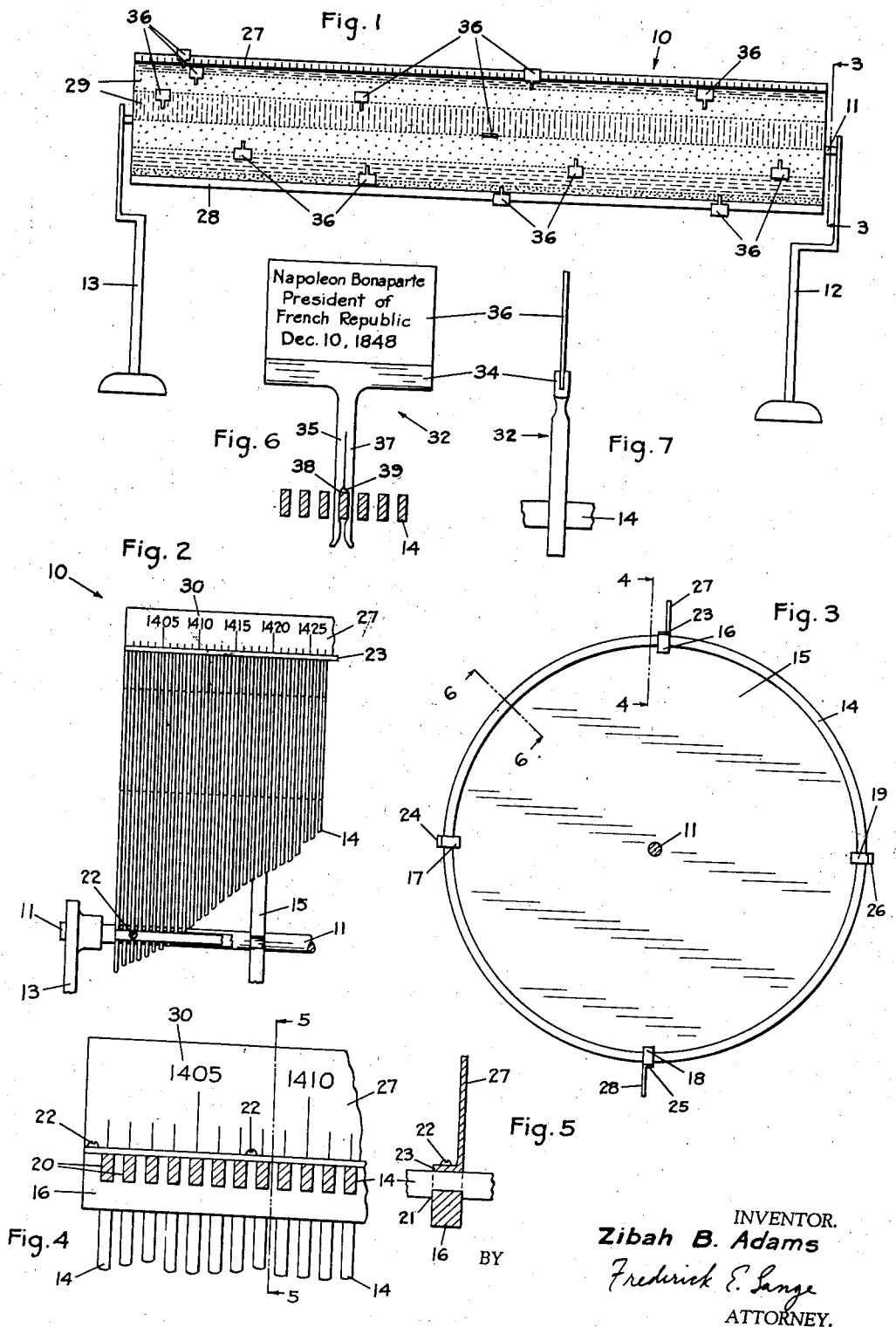
April 13, 1943.  Z. B. ADAMS  2,316,147
EDUCATIONAL DEVICE
Filed Nov. 22, 1941
INVENTOR.
Zibah B. Adams
Frederick E. Lange
ATTORNEY.

2,316,147

UNITED STATES PATENT OFFICE 2,316,147

EDUCATIONAL DEVICE

Zibah B. Adams, Clinton, Mo.

Application November 22, 1941, Serial No. 420,073

10 Claims. (Cl. 35—21)

The present invention relates to an educational device and more particularly to one designed to facilitate the teaching of history.

It is an object of my invention to provide an improved device for arranging information bearing members according to units and sub-units of classification in such a way that their relationship is clearly evident.

More specifically, it is an object of the invention, when applied to the teaching of history, to provide a device for arranging members bearing facts about historical events according to the months and years in which the events took place in such a way that the chronological relation of the facts is clearly evident to the student.

These objects are accomplished by providing a cylinder formed of a plurality of turns of a relatively narrow member with means for designating units of classification to which each turn corresponds and further means for dividing the cylinder into a plurality of longitudinal bands each of which indicates a sub-unit of classification. The device further comprises means for securing a plurality of indicia bearing members at selected places on the turns of the narrow member.

When applied to the teaching of history, each turn corresponds to one year and each band corresponds to one month of the year. In this application of the invention, a plurality of cards are provided, which cards are desirably clipped to the narrow member at a point corresponding to the month and year of the historical event described on the card.

Further objects and features of the invention will be apparent from a consideration of the accompanying specification, claims, and drawing, of which:

Figure 1 is a front elevational view showing my educational device;

Figure 2 is a front elevational view on a somewhat larger scale of a portion of my device;

Figure 3 is an end elevational view of the cylinder of my device;

Figure 4 is a sectional view of a portion of the cylinder taken along the line 4—4 of Figure 3 and on a much larger scale than Figure 3;

Figure 5 is a sectional view taken along the line 5—5 of Figure 4;

Figure 6 is a sectional view of the cylinder taken along the line 6—6 of Figure 3 on a somewhat larger scale and with a card holder and card secured to a rib of the cylinder; and Figure 7 is a side elevational view corresponding to Figure 6.

For a more detailed understanding of my invention, reference is now made to the drawing in detail.

As indicated in Figure 1, my device generally comprises a cylinder 10 which is journalled on an axle 11, which axle is in turn secured to a pair of vertical standards 12 and 13. As shown more clearly in Figures 2 and 3, the cylinder comprises a flat wire 14 spirally wound on its edge to form a plurality of turns constituting circumferentially extending ribs. This wire is wound around a cage formed of a pair of disks 15 and a plurality of bars 16, 17, 18, and 19. The bars 16, 17, 18, and 19 rest in grooves in the oppositely disposed disks 15 and are supported by disks 15, as will be explained in more detail later. The axle 11 extends through the center of disks 15 and rotatably supports the cylinder.

As best indicated in Figure 4, in which the details of a portion of bar 16 are shown, each of the bars 16, 17, 18, and 19 is formed with a plurality of slots 20. These slots are of slightly less depth than the depth of wire 14. Prior to the winding of wire 14 on the cage, the wire is provided with a series of notches 21 (as best indicated in Figure 5). These notches are spaced apart a distance equal to one-fourth of the circumference of the inner surface of the cylinder so that when the wire is wound on the cage, the notches fit over the lower edges of the slots 20. When the wire 14 is so positioned, the upper surface of the wire is substantially flush with the upper surface of bar 16.

Associated with the bars 16, 17, 18, and 19 are strips 23, 24, 25, and 26. Each of these strips is of substantially the same width as the corresponding bar with which it is associated. The strips overlie the bars and are secured thereto by a plurality of screws 25. It will be seen that the strips 23, 24, 25, and 26 serve to effectively clamp the turns of the wire 14 in position.

Integrally formed with strips 23 and 25 are rigid tape lines 27 and 28. As will be explained later, these tape lines carry suitable indicia 30 identifying various turns of wire 14.

It will be noted from the preceding description that the cylinder is formed of the helically wound wire 14, which is shown as rectangular in cross section, the wire being wound edgewise. It is preferable that the wire be relatively thin so as to provide for a large number of turns in a limited space with an appreciable amount of space between successive turns. It will further be noted that the bars 16, 17, 18, and 19 and the strips 23, 24, 25, and 26 form braces for the cylinder constituted by wire 14. These braces are supported by disks 15. The disks 15 are preferably disposed inwardly of the ends of the cylinder to minimize any tendency of the braces to sag in the middle. Because of these braces and the disks 15, the wire 14 is maintained rigidly in its cylindrical form.

As previously indicated, the device is intended for classifying various information bearing members according to any desired classification system. Particularly, it is contemplated to employ the device as an educational device in the teaching of history and related subjects. In general, each turn of wire 14 designates one unit of classification. The cylinder is preferably painted with a series of longitudinal stripes 29. Each of these stripes indicates a sub-unit of classification. Thus, in the particular embodiment which has been specifically illustrated in the drawing, each turn of wire represents one year of history. The tape lines 27 and 28 are each graduated on at least one side to indicate years of history, one mark being provided for each turn. With the cylinder in the position shown in Figure 1, the graduations of tape line 27 are visible while those of tape line 28 are concealed. Upon the cylinder being rotated 180°, the graduations of tape line 28 would be visible. Thus, no matter what the position of the cylinder, the graduations of one or the other tape line is visible with only a slight movement of the observer, if any. As shown in Figure 1, the cylinder comprises five hundred turns so as to represent five hundred years of history. In this embodiment, there are twelve longitudinal bands, these longitudinal bands representing the twelve months of the year. Thus, a portion of any turn of the wire 14 lying within one band corresponds to a definite month in a definite year.

Provision is made for attaching fact-bearing cards at various points on the cylinder. Referring to Figures 6 and 7, a card bearing standard is generally indicated by the reference numeral 32. This standard comprises a relatively long slotted portion 34 designed to act as a card clamp. Desirably, the two lips formed by the slot are sufficiently resilient to firmly engage the card placed in the slot. The lower stem portion of the standard is split to provide a pair of resilient legs 35 and 37 which are designed to straddle a turn of the wire 14 and firmly engage the same. The lower ends of the legs 35 and 37 are preferably turned outwardly slightly to facilitate the entrance of the wire between the legs. It is further desirable to curve the legs as at 38 and 39, to conform with the cross-sectional configuration of the wire 14 so that the legs more firmly engage the wire.

Where the device is used for the teaching of history, a plurality of cards 36 will be provided which will bear historical facts. Thus, in the example shown in Figure 6, the card bears a legend which reads as follows: "Napoleon Bonaparte—President of French Republic—December 10, 1848." This card would be inserted over the turn indicated by the tape line 27 as year 1848. At the same time, the card would be inserted at such a point on the turn that it is disposed within the band intended to represent the month of December. In Figure 1, a few of the cards 36 are shown in position. It will be obvious that many more of these cards can be added. In order to enable the placement of a large number of cards in closely adjacent spaces, the card-bearing standards 32 are made of varying lengths. It will be obvious that by placing a standard of relatively great length behind a standard of lesser length, both cards will be visible in spite of the fact that they may be located closely adjacent each other. As previously pointed out, by providing two tape lines 27 and 28, the year to which any turn corresponds can be readily seen regardless of the angular position at which cylinder 10 may be disposed.

It will be obvious that when a large number of fact cards have been placed at their proper places on the cylinder, it is possible to visualize very clearly the chronological relationship between the facts to which the cards relate. Due to the fact that the cards are mounted on a rotatable cylinder, it is possible by rotating the cylinder back and forth, to compare very clearly the relative positions of the cards. This is extremely valuable, particularly in the study of history where memory of various historical dates depends to a large extent upon the ability of the student to associate the dates with others. In the ordinary methods of studying history, a student is very prone to forget historical dates solely because he is unable to associate these dates with each other. With the present arrangement, this association is very vividly impressed upon the student.

While the various elements of the device can be made with any dimensions suitable for the particular application intended, I have found it particularly desirable where the device is employed as a historical educational device to employ a cylinder approximately forty-eight inches in circumference. It has also proven convenient to employ wire of such dimensions that there can be five turns to the inch with ample space between the turns. With this arrangement, where the device is intended to depict five hundred years of history, the cylinder employed is thus one hundred inches long. With an arrangement of this length, I have found it desirable to space the disks 15 about four inches inwardly from the ends to support more effectively the bracing bars 16 to 18. The bars 16 to 18, in this example, are one-fourth inch in width and one-half inch in depth. The tape line is one inch in width. In this same embodiment, the card bearing standards 32 are made in lengths of one inch, two inches, and three inches. This provides for placing the cards closely together with no obstruction of the view of the cards in the rear, as pointed out previously. While these various dimensions have proven desirable in the particular example discussed, it is obvious that other dimensions may be employed.

While the device has been specifically described in connection with the teaching of history, and is peculiarly adapted to this use, it is to be understood that it may be employed for various educational purposes and for various applications where it is desired to classify material according to headings and sub-headings. In general, while I have shown a specific embodiment of my invention, it is to be understood that this is for purposes of illustration and that the invention is to be limited only by the scope of the appended claims.

I claim:

1. In combination, a cylinder having a plurality of circumferentially extending ribs slightly spaced from each other, and a plurality of card holders, each having a slender stem adapted to engage over any one of said ribs and retain the card carried thereby rigidly in position, each of said stems being formed so as to engage only one rib at a time.

2. In combination, a cylinder having a plurality of circumferentially extending ribs slightly spaced from each other, means for mounting said cylinder for rotation about a horizontal axis, and a plurality of card holders, each having a slender stem adapted to engage over any one of said ribs and retain the card carried thereby rigidly in position, each of said stems being formed so as to engage only one rib at a time.

3. In combination, a cylinder having a plurality of circumferentially extending ribs slightly spaced from each other, means normally permanently associated with said cylinder for indicating first units of classification represented by the ribs of said cylinder, said cylinder bearing indicia dividing it into a plurality of longitudinally extending bands, each of said bands being designed to indicate a unit of classification which is a sub-division of said first unit of classification, and means for securing indicia bearing members at desired positions on said ribs.

4. In combination, a cylinder having a plurality of circumferentially extending ribs slightly spaced from each other, a member extending longitudinally of said cylinder closely adjacent to said ribs and carrying indicia designed to indicate first units of classification represented by the ribs of said cylinder, said cylinder bearing indicia dividing it into a plurality of longitudinally extending bands, each of said bands being designed to indicate a unit of classification which is a sub-division of said first unit of classification, and means for securing further indicia bearing members at desired positions on said ribs.

5. In combination, a cylinder having a plurality of circumferentially extending ribs of substantially rectangular cross-section slightly spaced from each other, an indicia bearing member extending longitudinally of said cylinder closely adjacent to said ribs and carrying indicia designed to indicate first units of classification represented by the ribs of said cylinder, said cylinder bearing indicia dividing it into a plurality of longitudinally extending bands, each of said bands being designed to indicate a unit of classification which is a sub-division of said first unit of classification, and means for securing further indicia bearing members at desired positions on said ribs.

6. In combination, a cylinder comprising a member helically wound so as to provide a plurality of slightly spaced turns, an indicia bearing member extending longitudinally of said cylinder closely adjacent to said helically wound member and carrying indicia designed to indicate units of classification represented by the turns of said member, said cylinder bearing indicia dividing it into a plurality of longitudinally extending bands, each of said bands being designed to indicate a unit which is a sub-division of said first-named unit of classification, and means for securing a further indicia bearing member to any turn of said member along any of said bands.

7. In combination, a cylinder comprising a member helically wound so as to provide a plurality of slightly spaced turns, an indicia member in the form of a strip extending longitudinally of said cylinder closely adjacent to said helically wound member and carrying indicia designed to indicate units of classification represented by the turns of said member, said cylinder bearing indicia dividing it into a plurality of longitudinally extending bands, each of said bands being designed to indicate a unit of classification which is a sub-division of said first unit of classification, and means for securing a further indicia bearing member to any turn of said member along any of said bands.

8. In combination, a cylinder comprising a cage and a narrow member helically wound on said cage so as to provide a plurality of slightly spaced turns, an indicia bearing member extending longitudinally of said cylinder closely adjacent to said helically wound member and carrying indicia designed to indicate units of classification represented by the turns of said member, said cylinder bearing indicia dividing it into a plurality of longitudinally extending bands, each of said bands being designed to indicate a unit of classification which is a sub-division of said first unit of classification, and means for securing a further indicia bearing member to any turn of said member along any of said bands.

9. In a historical educational device, a cylinder having a plurality of circumferentially extending ribs, said ribs being adapted to indicate years of history, said cylinder being divided into twelve bands corresponding to the twelve months, and means for attaching a plurality of cards bearing historical facts at points on said ribs representing the months and years in which the historical events took place.

10. In a historical educational device, a cylinder comprising a relatively narrow member helically wound so as to provide a plurality of slightly spaced turns, said turns being adapted to indicate years of history, said cylinder bearing indicia dividing it into twelve bands extending longitudinally of said cylinder and representing the twelve months of the year, and means for attaching a plurality of cards bearing historical facts at points on said ribs representing the months and years in which the historical events took place.

ZIBAH B. ADAMS.